US007142763B2

(12) United States Patent
Frohlich et al.

(10) Patent No.: US 7,142,763 B2
(45) Date of Patent: Nov. 28, 2006

(54) OPTICAL WAVEGUIDE DISTRIBUTION CABINET

(75) Inventors: Franz-Friedrich Frohlich, Hagen (DE); Michael Muller, Menden (DE)

(73) Assignee: CCS Technology Inc., Wilmington, DE (US)

( * ) Notice: Subject to any disclaimer, the term of this patent is extended or adjusted under 35 U.S.C. 154(b) by 0 days.

(21) Appl. No.: 10/524,946

(22) PCT Filed: Aug. 9, 2003

(86) PCT No.: PCT/EP03/08863

§ 371 (c)(1),
(2), (4) Date: Jul. 29, 2005

(87) PCT Pub. No.: WO2004/019101

PCT Pub. Date: Mar. 4, 2004

(65) Prior Publication Data

US 2006/0165364 A1    Jul. 27, 2006

(30) Foreign Application Priority Data

Aug. 15, 2002  (DE) ................................ 102 38 189

(51) Int. Cl.
*G02B 6/00*     (2006.01)
(52) U.S. Cl. ........................ 385/135; 385/134
(58) Field of Classification Search .............. 385/135
See application file for complete search history.

(56) References Cited

U.S. PATENT DOCUMENTS

| 5,530,954 | A  | * | 6/1996  | Larson et al. ............... 385/135 |
| 5,734,776 | A  |   | 3/1998  | Puetz ......................... 385/134 |
| 6,009,224 | A  | * | 12/1999 | Allen ......................... 385/135 |
| 6,424,781 | B1 | * | 7/2002  | Puetz et al. ................. 385/135 |
| 6,535,682 | B1 | * | 3/2003  | Puetz et al. ................. 385/135 |
| 6,556,763 | B1 | * | 4/2003  | Puetz et al. ................. 385/135 |
| 6,708,830 | B1 | * | 3/2004  | Mendoza ..................... 211/26 |
| 6,760,531 | B1 | * | 7/2004  | Solheid et al. ............. 385/135 |
| 6,826,280 | B1 | * | 11/2004 | Sajadi et al. ........... 379/413.04 |

FOREIGN PATENT DOCUMENTS

| CH | 623698 A5   | 6/1981  |
| EP | 0585809 A1  | 8/2003  |
| WO | WO00/52504  | 9/2000  |
| WO | WO02/103429 | 12/2002 |

* cited by examiner

*Primary Examiner*—Brian Healy
*Assistant Examiner*—Mary El-Shammaa
(74) *Attorney, Agent, or Firm*—Keith A. Roberson

(57) ABSTRACT

This invention relates to an optical waveguide distribution cabinet (10) comprising a housing (11), a frame (17) which is rotatably mounted in said housing (11) and assemblies which are fixed to said frame (17) and used to connect optical waveguides guided by patch cables (18). The frame (17) is shorter than the housing (11) in such a way that a holder (20) for the patch cables (18) is provided between an end of the housing (11) and an adjacent end of the frame (17). Said holder (20) is mounted in the housing (11) in a fixed manner and the frame (17) can be pivoted in relation to the holder (20).

11 Claims, 4 Drawing Sheets

OPTICAL WAVEGUIDE DISTRIBUTION CABINET

This National stage application claims the benefit of International Application No. PCT/EP03/008863, filed on Aug. 9, 2003, which claims the benefit of German Patent Application No. 10238189.5, filed on Aug. 15, 2002, and which was not published in the English language under PCT Article 21(2).

FIELD OF THE INVENTION

The invention relates to an optical waveguide distribution cabinet.

BACKGROUND OF THE INVENTION

When designing optical waveguide cable networks, distribution cabinets are required in order to ensure structured wiring. One requirement to which optical waveguide distribution cabinets are subject is that they be equipped to the maximum extent with a high packing density and with little mechanical load on the optical waveguides at the same time. For example, it is already known from the prior art for a frame which can pivot to be arranged in an optical waveguide distribution cabinet, to which frame assemblies are attached for connection of optical waveguides which are guided by means of patch cables. This allows structured wiring and a high packing density within a simple optical waveguide distribution cabinet.

However, if the patch cables are intended to be passed out of the optical waveguide distribution cabinet for connection to another, in particular adjacent, optical waveguide distribution cabinet, then this can be done only to an inadequate extent with distribution cabinets which are known from the prior art since either the patch cables can only be passed out of the optical waveguide distribution cabinet separately—that is to say in small quantities—or, on the other hand, this adversely affects the structured and quick connection of the patch cables.

Against this background, the present invention is based on the problem of providing a novel optical waveguide distribution cabinet.

This problem is solved by an optical waveguide distribution cabinet as shown and described herein. In the optical waveguide distribution cabinet according to the invention, large quantities of patch cables can be passed out of the optical waveguide distribution cabinet without any adverse effect on the structured and fast connection of the patch cables.

According to one preferred development of the invention, the guide for the patch cables has an opening, with the patch cables being passed through the opening from the guide into the holder, and with the opening being positioned in an area of the guide which is arranged adjacent to or in the vicinity of the pivoting axis of the frame. In particular, the opening is located in that area of the guide through which the pivoting axis of the frame extends. This ensures that the patch cables, and hence the optical waveguides, are subject to only minimal mechanical loads.

BRIEF DESCRIPTION OF THE DRAWINGS

Preferred developments of the invention can be found in the following description. One exemplary embodiment will be explained in more detail with reference to the drawing figures, in which.

DETAILED DESCRIPTION OF THE INVENTION

FIGS. 1 to 4 show details of an optical waveguide distribution cabinet according to the invention, in the form of various perspective views. An optical waveguide distribution cabinet such as this is required to form structured wiring for optical waveguide cable networks.

Figure 1:
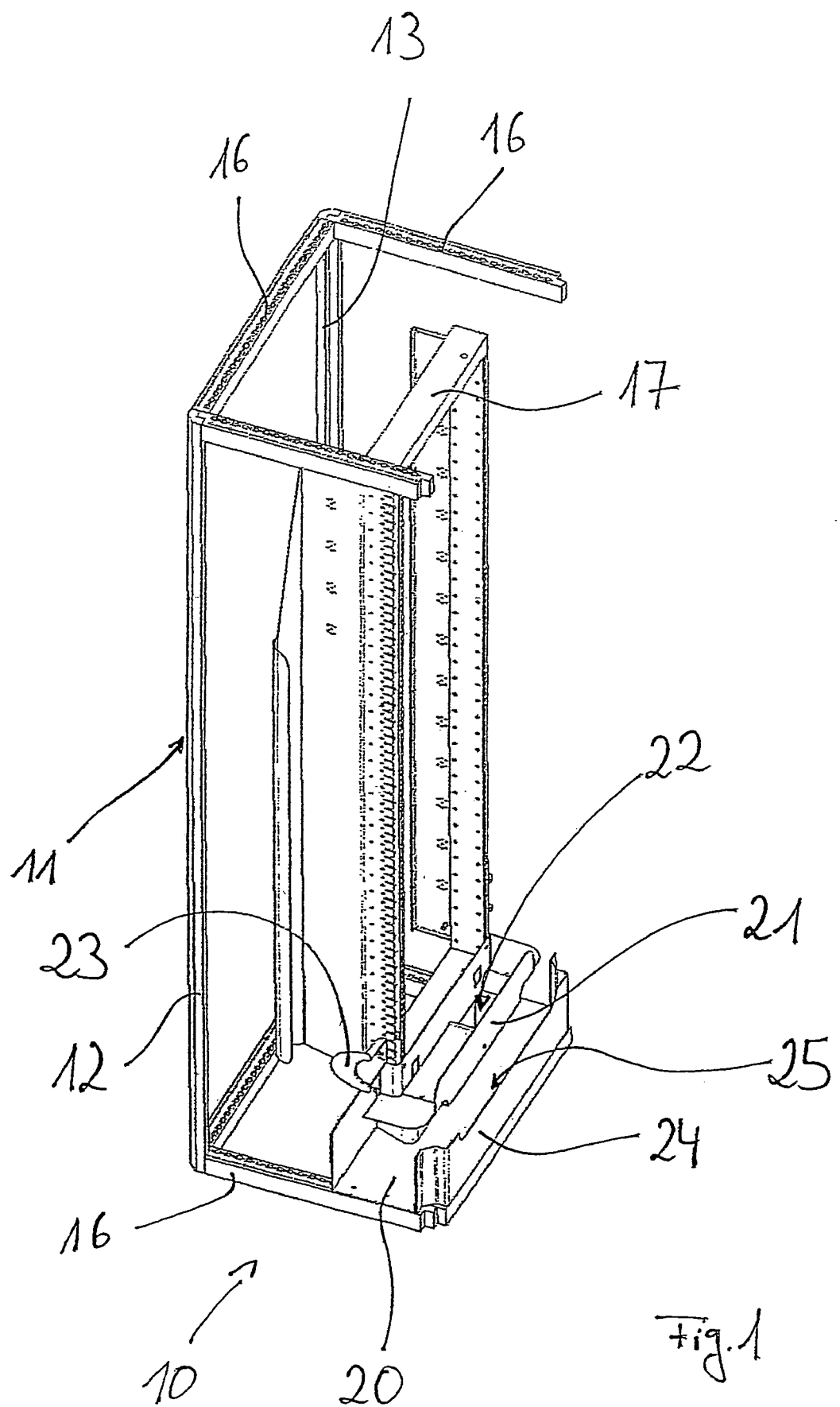
FIG. 1 shows a detail of an optical waveguide distribution cabinet according to the invention, in the form of a perspective side view.
Figure 2:
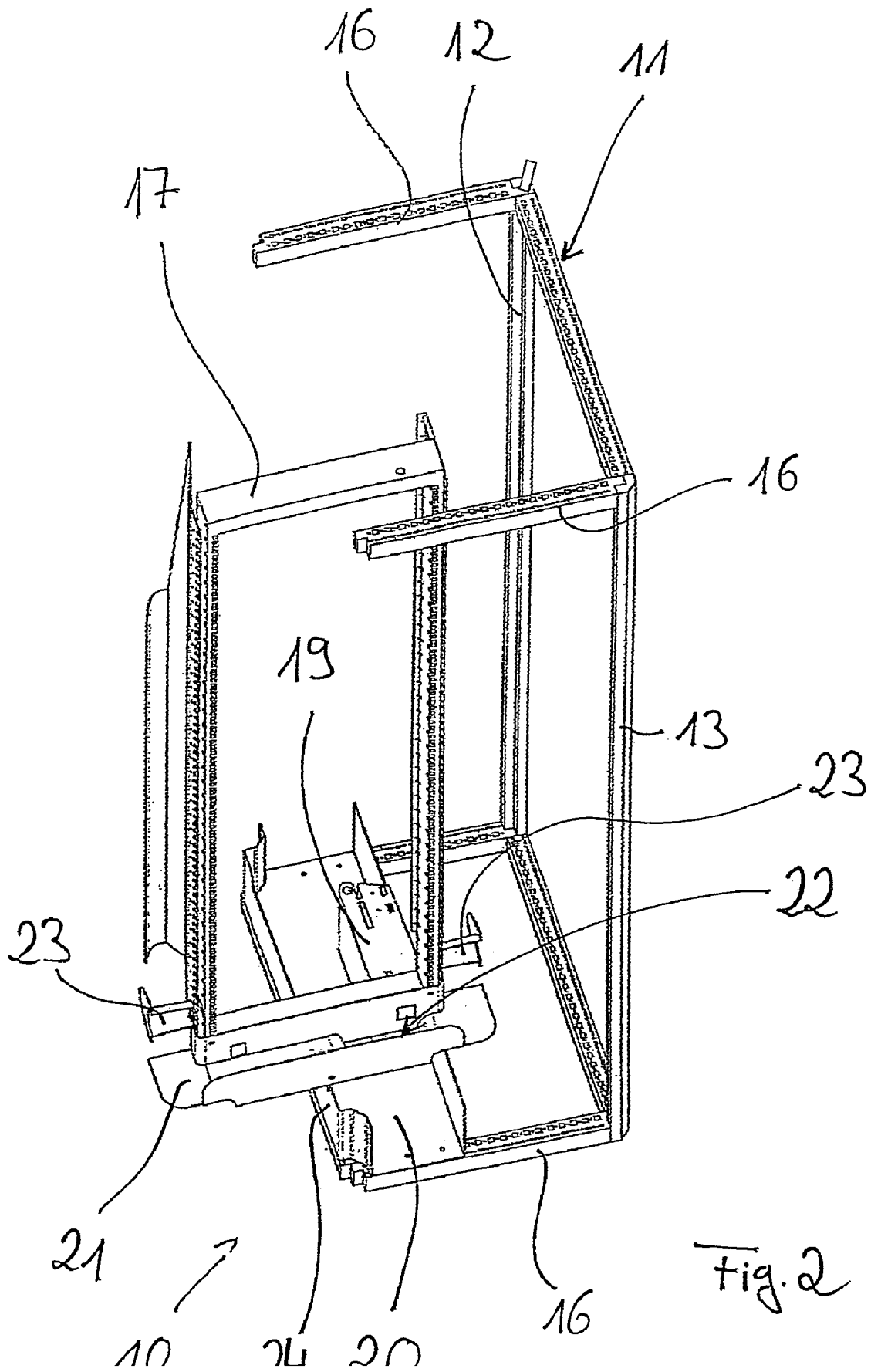
FIG. 2 shows the detail shown in FIG. 1 with a pivoted frame of the optical waveguide distribution cabinet according to the invention, in the form of a perspective side view rotated with respect to FIG. 1.
Figure 3:
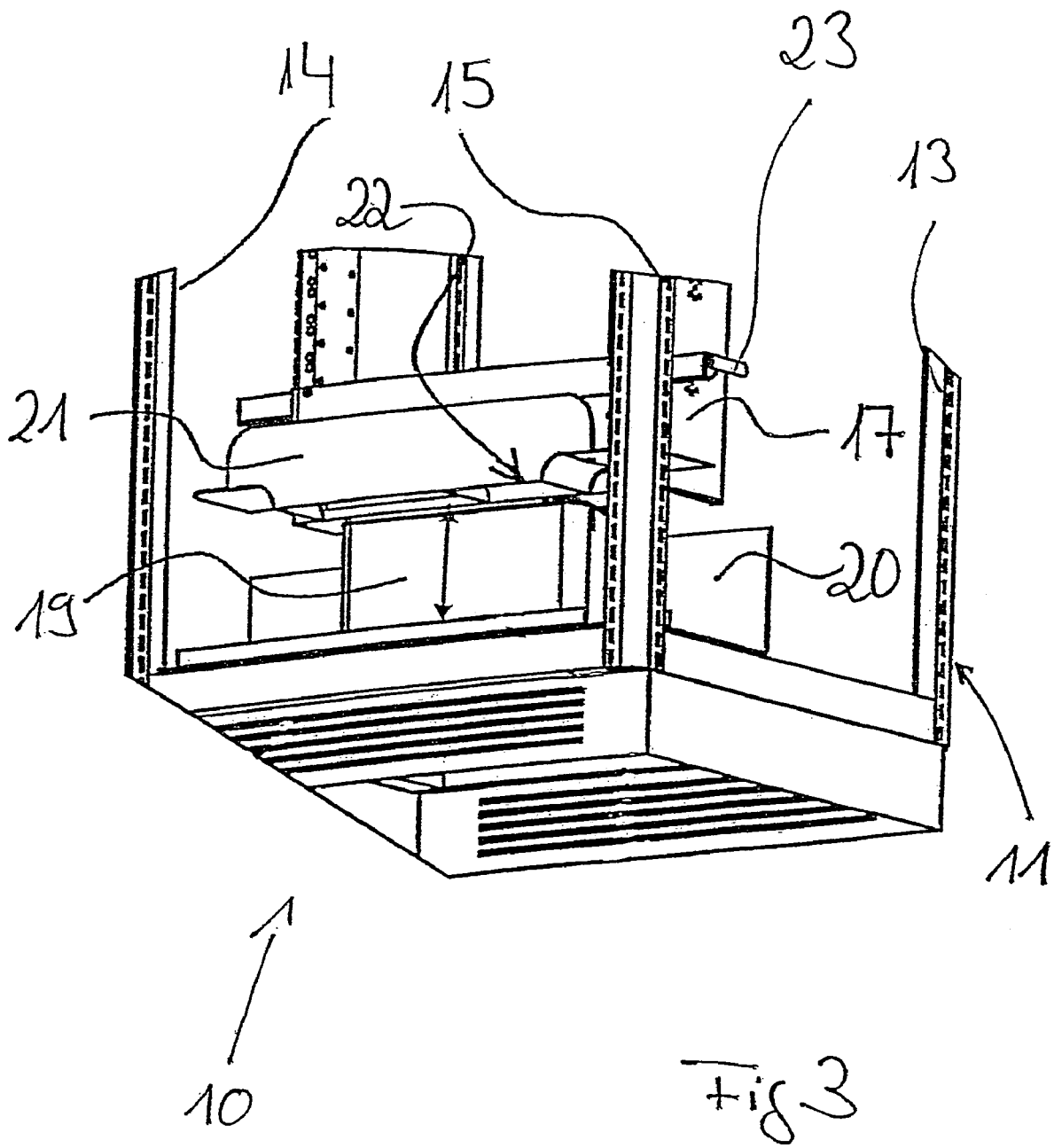
FIG. 3 shows a detail of the optical waveguide distribution cabine according to the invention, in the form of a perspective view from underneath.
Figure 4:
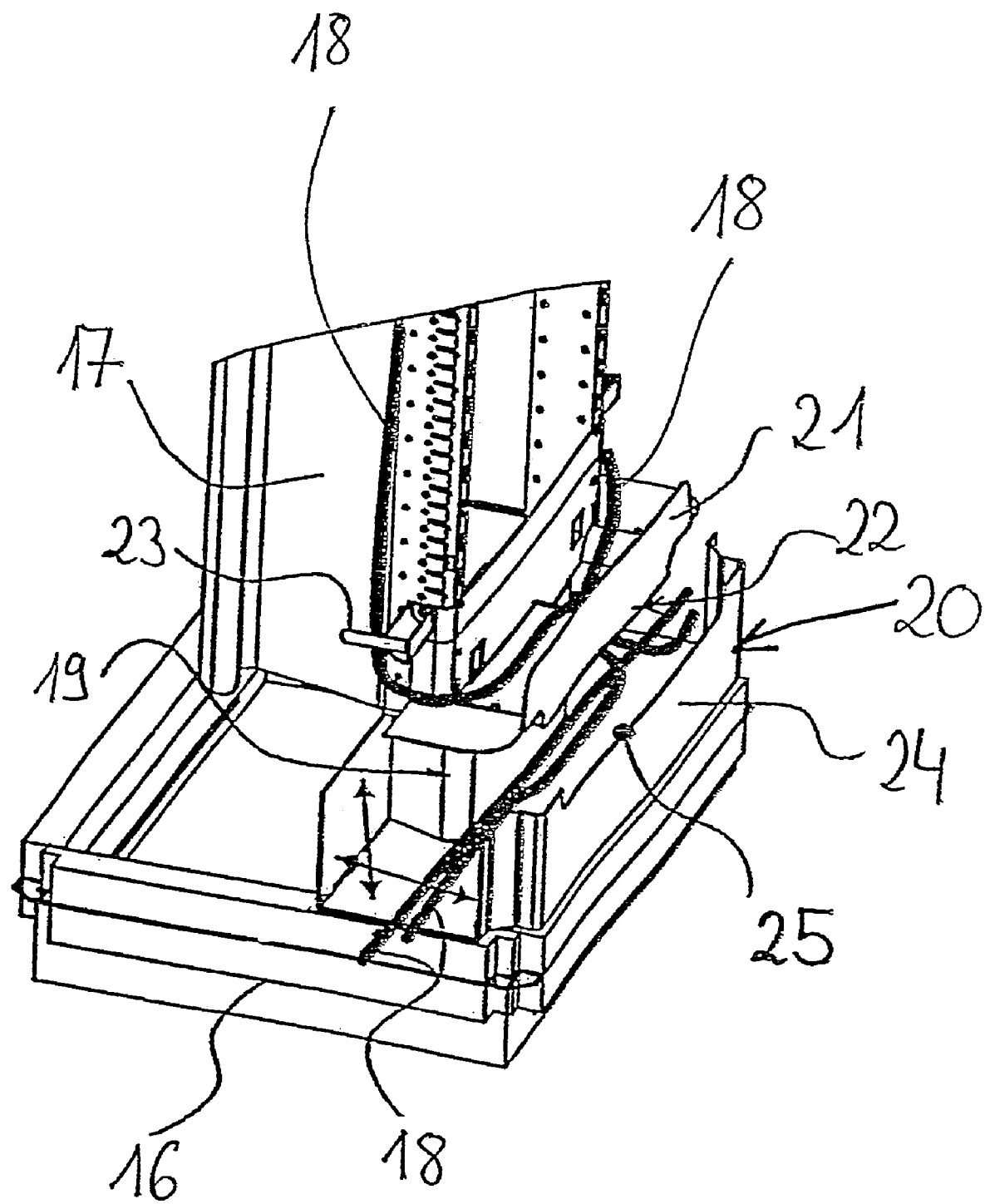
FIG. 4 shows a further detail of the optical waveguide distribution cabinet according to the invention, in the form of a perspective side view.

An optical waveguide distribution cabinet 10 has a housing 11 which is formed by struts that extend in the area of its longitudinal edges. FIGS. 1 and 2 thus show two struts 12, 13, which extend in the vertical direction of the housing 11 and are arranged on a rear face of the housing 11. The housing 11 likewise has vertically running struts 14, 15 on the front face, although these are not illustrated in FIGS. 1 and 2 in order to improve the illustration, but they are shown in FIG. 3. Horizontally running struts 16 extend between the vertically running struts 12, 13, 14 and 15. The horizontally running struts 16 each respectively connect two vertically running struts 12 and 13, 14 and 15 or 13 and 15 to one another. The struts 12, 13, 14, 15 and 16 accordingly form the housing 11 of the optical waveguide distribution cabinet 10 according to the invention.

A frame 17 is positioned within the housing 11, and can pivot with respect to it. This is illustrated in particular in FIGS. 1 and 2. FIG. 1 thus shows a frame 17 which has been pivoted into the housing 11 of the optical waveguide distribution cabinet 10, and FIG. 2 shows a frame 17 which has been pivoted out of the housing 11. The frame 17 is used to hold assemblies, which are not illustrated, for connection of optical waveguides that are carried in patch cables 18 (see FIG. 4). These assemblies which are not illustrated for the connection of optical waveguides which are carried by means of patch cables 18 are typically plug connector modules or splicing modules which are combined to form so-called mounting racks. The arrangement and configuration of the assemblies which are mounted in the frame 17 (which can pivot) for connection of the optical waveguides are familiar to the relevant persons skilled in the art and require no further explanation.

According to the invention, the frame 17 which can pivot is designed to be shorter than the housing 11. The height of the frame 17 which can pivot is accordingly less than the height of the housing 11. In other words, the height of the frame 17 is designed to be shorter than the height of the housing 11. As can be seen in particular from FIGS. 2 and 3, the shortened frame 17 according to the invention is mounted on a base 19 such that it can pivot. The base 19 is positioned approximately centrally in a holder 20 in the area of a bottom of the housing 11. The base 19 and the holder 20 are accordingly firmly connected to those struts 16 of the housing 11 of the optical waveguide distribution cabinet 10 which form the bottom of the optical waveguide distribution cabinet 10. The frame 17 can accordingly be pivoted with respect to the housing 11, and thus with respect to the holder 20 and the base 19. The holder 20 and the base 19 form a mechanical unit which withstands all forces that occur, such as the load on the frame 17, and tilting and turning moments during pivoting of the frame 17. The base 19 is designed such that the frame 17 can be pivoted in both directions, that is to say the frame 17 can be pivoted to the left or to the right.

As has already been stated, the base 19 is arranged centrally in the holder 20. The base is in this case shorter and less deep than the holder 20, thus creating free spaces on both sides of the base 19 and in front of the base 19 for the patch cables 18 in the holder 20. Longitudinal edges of the base 19 are rounded in order that the patch cables 18 in the holder 20 are not damaged, in particular when the patch cables 18 move along the longitudinal edges of the base 19 during pivoting of the frame 17.

The shortening of the frame 17 by the height of the base 19 and the above refinement of the base 19 accordingly create a space for holding the patch cables 18 in the bottom area of the optical waveguide distribution cabinet 10, which space extends from one side of the optical waveguide distribution cabinet 10 to the opposite side, and is not influenced by the pivoting movement of the frame 17.

A guide 21 for the patch cables 18 is associated with a lower end of the frame 17. The guide 21 can pivot together with the frame 17 with respect to the housing 11, and thus with respect to the holder 20 and the base 19. The guide 21 is used to guide the patch cables 18 accommodated in the optical waveguide distribution cabinet 10, and for the patch cables 18 to be passed through into the holder 20. The guide 21 has an opening 22 for this purpose. The patch cables 18 can be passed through the opening 22 from the guide 21 into the holder 20. The size and position of the opening 22 are in this case chosen such that the patch cables 18 are subject to minimal mechanical loads during pivoting of the frame 17.

For this purpose, the opening 22 is positioned in an area of the guide 21 which is arranged adjacent to or in the vicinity of the pivoting axis of the frame 17. In particular, the opening 22 is located in that area of the guide 21 through which the pivoting axis of the frame 17 extends. In other words, the opening 22 is accordingly arranged in a preferred manner in the immediate vicinity of a rotation point of the frame 17 which can pivot. Furthermore, the opening 22 is positioned in the guide 21 in such a way that it is arranged away from the area of the base 19, to be precise both when the frame 17 is being pivoted into the housing 11 and when the frame 17 is being pivoted out of the housing 11. During the pivoting of the frame 17, the patch cables 18 are accordingly neither compressed, twisted or bent. Mechanical loads on the patch cables 18 and thus on the optical waveguides which are carried by the patch cables 18 are avoided. In the context of the patch cables 18 being guided without any loads, it is also important that deflection plates 23 are likewise positioned in a lower area of the frame 17, which can pivot, adjacent to the guide 21. The deflection plates 23 allow the patch cables 18 to be passed through an angle into the guide 21 from the frame 17 which can pivot with minimal mechanical loads.

The holder 20, which is in the form of a cable trough, has side apertures in the area of the struts 16 and is open at the sides in the area of the struts 16. This allows the patch cables 18 to be passed out of the optical waveguide distribution cabinet 10 in a particularly simple manner, and to be supplied to an optical waveguide distribution cabinet which is, for example, adjacent but is not illustrated in order to form a continuing wiring system. A front wall 24 of the holder 20 has a cutout 25 which is open at the top in order in this way to make it easier to access the patch cables 18, which are carried in the cable trough or holder 20, from the front. In order to improve the illustration of the base 19, the front wall 24 is not shown in FIG. 3.

The invention accordingly provides an optical waveguide distribution cabinet which has a frame which can pivot for simple and fast connection of optical waveguides which are carried by patch cables, and in which large quantities of patch cables can be passed out of the optical waveguide distribution cabinet in a simple manner and with minimal mechanical loads.

Although, in the illustrated exemplary embodiment, the space which is formed by the holder 20 is arranged to guide the patch cables 18 from one side of the optical waveguide distribution cabinet 10 to its other side in the area of the bottom wall of the optical waveguide distribution cabinet 10, an embodiment is also feasible in which this space is provided between an upper end of the frame 17 and a roof of the housing 11. However, the arrangement in the area of the bottom is preferable for reasons relating to simplified accessibility to the patch cables and installation convenience. Apart from the horizontally running struts 14, 15, there are no obstructions to fast installation of the patched cables 18 on the front face of the optical waveguide distribution cabinet 10.

What is claimed is:

1. An optical waveguide distribution cabinet, having a housing and a frame which is mounted in the housing such that it can pivot, with assemblies for connection of optical waveguides that are carried by means of patch cables being attached to the frame, wherein the frame is designed to be shorter than the housing such that a holder for the patch cables is arranged between one end of the housing and an adjacent end of the frame, with the holder being firmly mounted in the housing and the frame being able to pivot with respect to the holder.

2. The optical waveguide distribution cabinet as claimed in claim 1, wherein the holder is arranged between a lower end of the housing and a lower end of the frame.

3. The optical waveguide distribution cabinet as claimed in claim 1, wherein a guide for the patch cables is arranged at the lower end of the frame.

4. The optical waveguide distribution cabinet as claimed in claim 3, wherein the guide has an opening, with the patch cables being passed through the opening from the guide into the holder.

5. The optical waveguide distribution cabinet as claimed in claim 4, wherein the opening is positioned in an area of the guide which is arranged adjacent to or in the vicinity of the pivoting axis of the frame.

6. The optical waveguide distribution cabinet as claimed in claim 4, wherein the opening is positioned in an area of the guide through which the pivoting axis of the frame extends.

7. The optical waveguide distribution cabinet as claimed in claim 1, wherein the holder has side apertures such that the patch cables can be passed out of the optical waveguide distribution cabinet.

8. The optical waveguide distribution cabinet as claimed in claim 3 wherein deflection plates are arranged on side elements of the frame in an area above the guide.

9. The optical waveguide distribution cabinet as claimed in claim 1, wherein a front wall of the holder has a cutout which is open at the top.

10. The optical waveguide distribution cabinet as claimed in claim 1, wherein the frame is mounted on a base, which is arranged in the holder and is connected to the holder.

11. The optical waveguide distribution cabinet as claimed in claim 10, wherein the base is positioned approximately centrally in the holder and has a width and a depth which are shorter than the holder.

* * * * *